(12) United States Patent
Egan

(10) Patent No.: US 7,241,945 B1
(45) Date of Patent: Jul. 10, 2007

(54) MORPHEUS MUSIC NOTATION SYSTEM

(76) Inventor: Mark Patrick Egan, Baylough, Athlone, Co.Westmeath (IE)

( * ) Notice: Subject to any disclaimer, the term of this patent is extended or adjusted under 35 U.S.C. 154(b) by 23 days.

(21) Appl. No.: 11/016,438

(22) Filed: Dec. 20, 2004

(51) Int. Cl.
*G09B 15/02* (2006.01)

(52) U.S. Cl. .................................. 84/483.2; 84/471 R

(58) Field of Classification Search ............... 84/483.2, 84/470 R, 471 R
See application file for complete search history.

(56) References Cited

U.S. PATENT DOCUMENTS 3,208,327 A * 9/1965 Allen ........................ 84/471 R
3,822,630 A * 7/1974 Leonard .................... 84/471 R
2004/0007118 A1* 1/2004 Holcombe ................. 84/483.2
2005/0016359 A1* 1/2005 Berens ...................... 84/470 R

* cited by examiner

*Primary Examiner*—Lincoln Donovan
*Assistant Examiner*—Jianchun Qin
(74) *Attorney, Agent, or Firm*—Our Pal LLC

(57) ABSTRACT

Devices, methods and system for a morpheus music notation system adapted for key, string, wind and percussion instruments for ease of teaching and learning music intuitively. Intuitive morpheus music notation system creates a simple environment revolving around numbers and letters to enable people of all ages of any race or colour whether they are with sight or without to learn any musical instrument. The idea relates to all instruments, wind, brass, stringed, bowed, percussion, keyboard, unusual global instruments, organ & electronic instruments. Also relates to a set of hand movements performed by conductors of music.

7 Claims, 3 Drawing Sheets

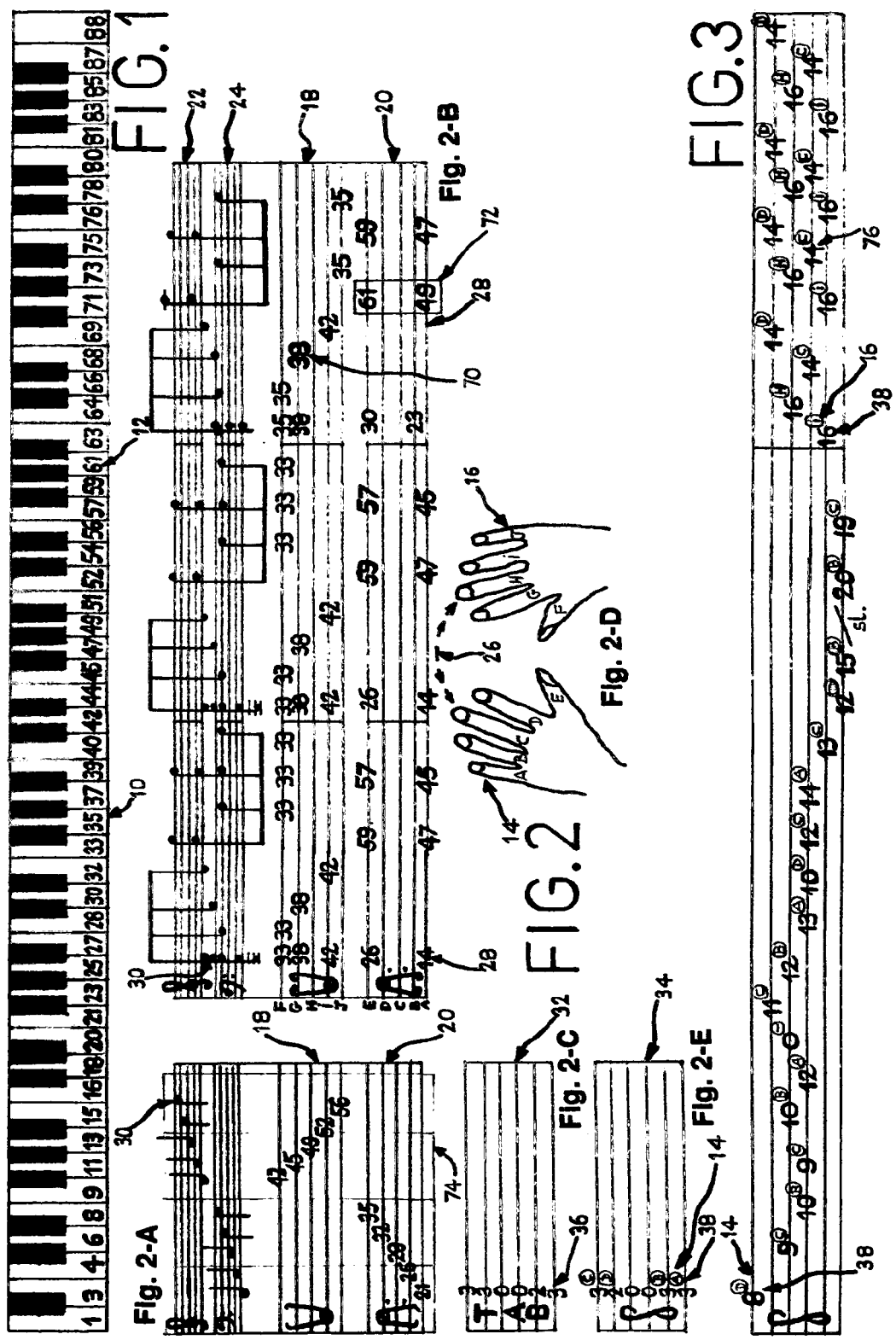

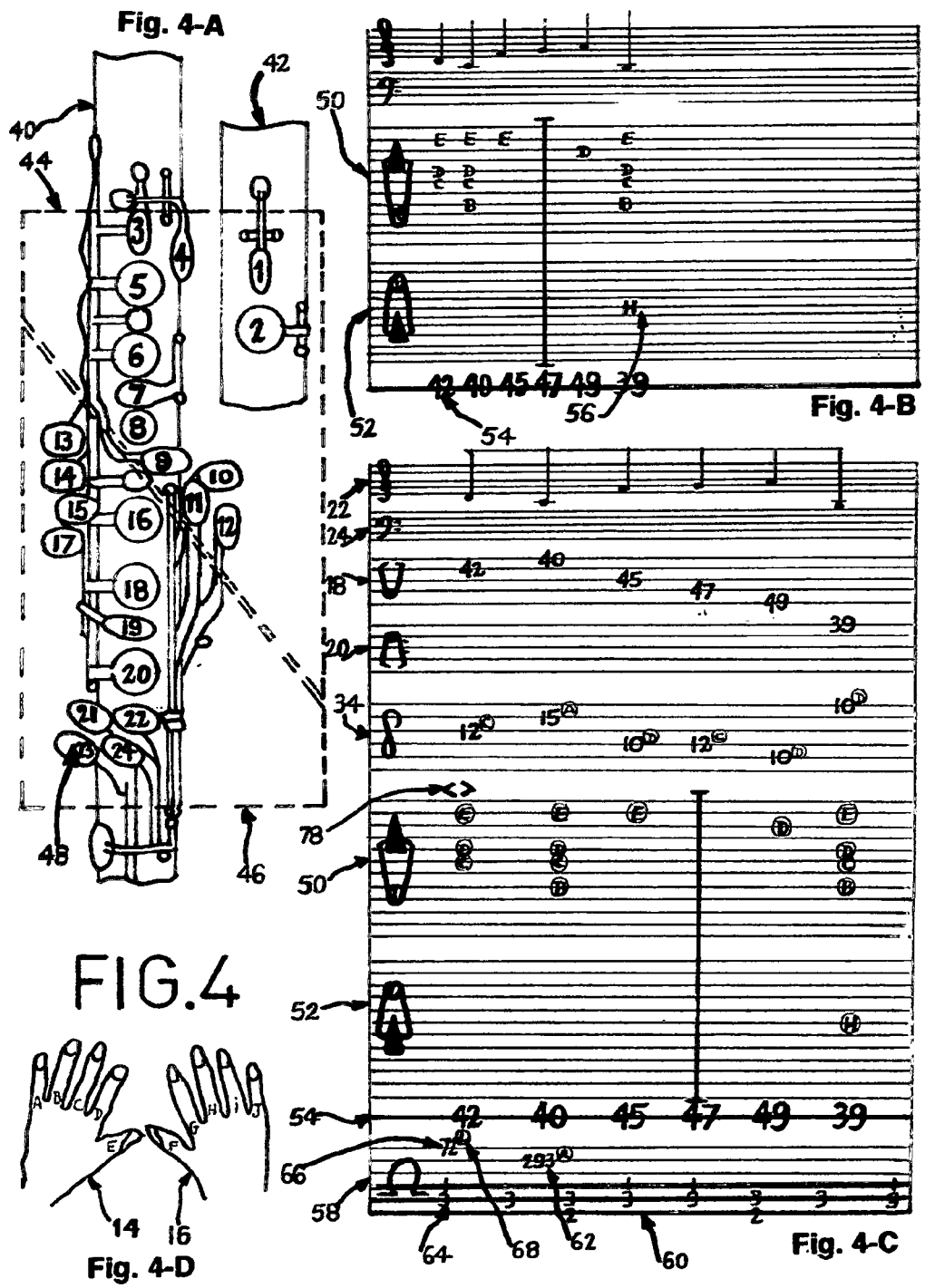

MORPHEUS MUSIC NOTATION SYSTEM

BACKGROUND

This invention relates generally to the art of music. More particularly it relates to the art of teaching and learning of music through a simplified music notation system. Even more particularly it relates to a morpheus music notation system adapted for key, string, wind and percussion instruments for ease of teaching and learning music intuitively. Unlike prior art bottom up notation systems, morpheus system is top down, which is intuitive and even conventional in the western languages.

THE PROBLEM

All musical instruments available today pivot around the audio spectrum of the 88 keys on a classical piano. From a primary age children systematically learn the alphabet and to count to 100. The traditional Musical Treble & Bass Clefs are combined with two additional Clefs referred to as the Leda Clef (Left Hand) & the Rama Clef (Right Hand). Both the Leda & Rama Clefs contain five lines as is the case in traditional music Clefs. The fingers are given letters i.e., A, B, C, D, E, (Left Hand) & F, G, H, I, J (Right Hand). These letters are then applied to both these Clefs and the use of the Butterfly Effect in regards to how humans read literature in general is then functional. From the music sheet the numbers of the exact keys are used in both Clefs i.e., C3=28 where this is the 28th key on the classical piano. Using the notation the student recognises the numbers on the Clefs in reference to the piano and uses the correct fingers with the correct note no matter how complex the music is. The method also leaves the students with the option that they never have to learn any traditional musical theory of any level.

The morpheus notation system of this invention is adaptable to every single musical instrument (including all key, string, wind and percussion instruments) within the audio spectrum and makes it possible for children, adults, elderly and the blind to learn a musical instrument.

Problems with prior art music notation and teaching systems are as follows.

a) Complex & Cumbersome
b) Not Intuitive
c) Expensive
d) Lack user friendliness for teacher and student
e) Tedious to teach and learn
f) Not conducive to self-teaching
g) Do not help create master musicians let alone pushing the envelope Another problem with prior art music notation systems is that it can take seven to eight years for children to familiarise themselves with traditional notation. The theory revolves around the Bass & Treble Clefs which contain 5 lines on each stave and symbols on these lines & spaces represent the notes to play. Music timing involves crotchets, quavers, semibreves etc., to name a few and notes that then create chords are laid out on the staves in a complex method. Then you have sharps, naturals, flats to understand. All in all standard notation is just one big algebraic equation and to learn it requires years of practice.

For hundreds of years many people worldwide have not bothered to undertake the chore of playing an instrument, or have undertaken the chore of playing an instrument, but failed to continue with it for one solitary reason. This reason is described further with regards to the inconvenience with the Music Notation System in place today and are as follows.

The music notation system of prior art was created thousands of years ago by highly intelligent people, which was absolute genius at the time, where music was broken down into stages in which people could learn to sing or play an instrument, under a worldwide standard method. Unfortunately, the consequence of this, was that because it was created by highly intelligent people, it required highly intelligent people to understand it. People had to start at a young age to learn music which then took eight or nine years to even gain the standard of being a master of a particular instrument.

The world today does not revolve around children or in general people learning an instrument. Unfortunately, children and people are so wrapped up in the computer technology of today i.e., video games, cinema, computer games, hand held games and on line gaming etc, that many people will never experience playing a musical instrument and will grow up in a non-expressive & monotonous society. And yet when they become teenagers, the first thing they do when you have your Pop Idol or Pop stars shows on TV, is queue in their thousands outside buildings in order to become a pop star. All a person has to do is look at these shows, to see the worldwide interest in them.

All it really is though is taking advantage of young teenagers, who just fancy the quick method to get on TV. When they get there, they are so overwhelmed by the status of being a pop star that they can't cope with it and the artists drift off into the night, never to be seen again. Bands nowadays are not staying as bands because society today conveys that everything we do has to happen instantly. Music is no longer an enjoyable experience for them and the sad thing, is that the competition within musical artists today is disastrous.

Because of the ever increasing idea today within the record industry that a 'quick buck' is more important than breeding talent, they constantly go back in time and cover a song or tune and re-release it. I blame the original artists of these songs for this recurrent trend for if they didn't give permission to record companies, the record companies would not be able to re-release these famous songs. Music today has no innovation behind it and if we were to depend on classically trained musicians to come up with new ways to play instruments, we would be waiting a long time. For they get so wrapped up in learning the traditional musical theory of today that they cannot and will not step outside of it. Some of these brilliant musicians fail to even have the ability to play simple melodies in pubs & restaurants and in general life, without reading from music sheets. Even the music they systematically learn for ten & twenty years, still cannot be played without traditional musical notation in front of them. It used to be the case back in the 80s, 90s that only R&B music would use previously released music to come up with rhythms, chorus lines & hook lines, but these days every single genre of music is using this method, which really doesn't say much for the artists around today.

The above topics covered are just some of the disadvantages of traditional music notation of today. To define my creation I will reference to the disadvantages listed above to help you understand how revolutionary the idea is and how it will change the way the world learns musical instruments.

a) Morpheus Music notation is so basic that people whether with sight or without from the age of five or six will be able to learn a musical instrument (no matter how difficult general opinion claims an instrument to be at the moment)

without the need to study the musical theory of today of any level. Nor does it require the person to ever learn it in the future.

b) I have created this type of notation through the stubbornness of refusing to learn traditional musical theory myself. I have always wondered since national school where I had 6 months lessons in the piano accordion, in which I was tutored by a blind person, that we do not necessarily need our eyes to be able to play music. Music is an emotion not a dictatorship idea of how and why you can only play certain music structures together. Traditional notation orbits around strict rules that are to be obeyed no questions asked. Don't know how many times I have browsed the internet to find the repetitive saying that "you have to learn musical theory to play an instrument". Because of the simplicity of the idea a student learns how to play an instrument using the correct finger configuration from the very beginning. Parents will find the idea so effortless that they will be able to explain it to their kids, their child will understand instantly and then the child will learn to develop his/her mind much faster, becoming a master of the instrument in an incredible short period of time. Parents will not have to pay immense amounts of money to tutors & teachers in order for their child to learn an instrument, the child will be able to develop their ability while still learning the correct way to play an instrument. This will be done in an enjoyable atmosphere bringing parents closer to their children spending valuable time with them on something they can share together.

c) Because of the simplicity of the top down morpheus concept, it means that children through word of mouth will begin to realise how easy it is to learn an instrument and the vision of children staring into computers, TV screens for several hours on a daily basis will become a thing of the past. It will still occur, but not on the scale it is today. An instrument develops the mind rapidly. The idea means that a persons ability develops much faster because of the freedom of the mind to think up new ideas and will find it easy to learn less complicated music while they continue their standard classical training on their own. Technological advances these days in music software packages for computers enable students to slow tempos down on difficult & complex pieces of music without altering the pitch. With this in mind the option is there so they can learn at their own pace and develop their ability up to the original tempo of a piece of music gradually. The person also develops and creates unknowingly the ability while using the system a type of internal tempo/sync clock within their brain. This gives unprecedented measures of natural rhythm.

d) The most advantageous thing about this new notation system is that because more people are taking up the task of learning an instrument, that music in general will develop at a faster pace. Children who begin learning at an early age will have fully matured with the instrument within a few years which will lead to better musicians, this leads to a better standard of music and innovation in music because of the freedom to expand the imagination. All combined with the enjoyable experience of learning an instrument under this system will leave record companies in competition with each other to find a better music standard, better bands & musicians because of the quality of musicians and amount of musicians making innovative music. This will then leave them with no option but to sign innovative musicians and bands and leave the songs of the past as they should be, in the past and left alone. All the famous music of years ago should be aloud to breathe into our lives with the original artists, where we remember where we were when that song was played for the first time. Society does not need record companies going back into the past and obtaining some brilliant piece of music and then getting some teeny bop!! kid or band to sing it, because it looks good visually, but can't hold its own when questioned on talent. These kids do not realise what is involved in writing a piece of famous music, they just want to be famous. Maybe if they were learning instruments they would realize that the standard of music in the world today, needs a major overhaul. They should be encouraged to change it on an enormous scale for the better.

SUMMARY

This invention comprises methods, devices and system for learning and teaching key, string, wind and percussion musical instruments through a simplified morpheous music notation system. The first skills learned in school by children are the alphabet and the ability to count to 100. So by default by the age of five or six 90% of the world population are adept in these two skills. Alphabet & Numbers create a simple environment to work with, through these is where my idea originated from. However the enormous difference between the traditional method and all previous methods is that my new method trains people how to create music through their hearing and their mind.

Simplicity opens the music creativity window. Our sense of hearing is one of the most important senses of the human body. When a person loses their sight their brain automatically compensates for the loss by increasing the other senses of the human body. Their hearing becomes so acute that their audible range increases above the normal hearing range of the general population with sight, and most importantly they learn for the first time how to genuinely listen. The following example explains.

In the scene from the movie Fahrenheit 9/11 directed by Michael Moore the Ground Zero disaster was portrayed, but with one incredible difference between everything we had seen on our TV screens since the disaster. They had a black screen integrated with the noise of the 2 planes crashing into the tower along with the screams of the hundreds of people who were below. What went on in your head at that moment was more powerful than if you had been shown the disaster visually as well. The way silence is brilliantly used in movies & music is another example. People need to change the way they learn musical instruments. They need to learn how to listen. Many occasions I have met brilliant classically trained musicians who can't play simple songs where their reply is "can I have the sheet music please".

Music is many thousands of years old and within these years there have been many methods of teaching music so to find elements of any new teaching method in prior art (as is the case with hi-fi stereos, televisions or video recorders etc used as examples here of prior art in mechanical devices) is not uncommon. However, the methods in prior art still carry many disadvantages that are still too complex for children, adults & the elderly alike to comprehend when learning an instrument. Since music first began a standard international method of learning music was established in order to create an environment for people to learn music and is explained as follows:

A standard classical piano in music consists of a series of white & black keys. The white keys are named after the first seven letters of the alphabet A,B,C,D,E,F,G, which indicate musical notes. Position of each note always remains identical in relation to the specific black keys.

Musical Stave/Staff

Music is written on two staves. Each of them the 'Treble Clef' has the melody with right hand and the 'Bass Clef' has the accompaniment with the left hand. Each stave has five lines and 4 spaces. Notes are written between these lines & spaces on the Treble Clef as follows: on 5 lines they are E,G,B,D,F notes in the four spaces are F,A,C,E. Notes written above & below these lines are written on small additional lines called Leger lines. Notes for the Bass Clef are written as follows: on the lines they are G,B,D,F,A and the notes on four spaces are A,C,E,G.

Middle 'C' Note

All 'C' notes on the classical piano are located to the immediate left of each pair of black keys and the middle 'C' is located near the centre of the piano a little off left.

Music Timing

Another factor in music is the timing of each note. Several symbols, but the four most common ones are the quaver, semibreve, minim & crotchet. When a dot is placed after the note it signifies that the value of the note is increased by a half. For example: minim=2 beats, a dotted minim=3 beats.

Chords

Chords are groups of notes played at the same time. This breaks down into 3 notes consisting of C,G,C and are played together on the piano. The 3 notes must be depressed at the same time and should be released at the same time.

Sharps; Naturals; Flats.

a) When a Sharp is placed before a note it raises the musical pitch of that note by half a tone. When you see it you play the next key (black or white) to the right side of the note.

b) When a Natural symbol appears any sharpened or flattened note returns to its original or natural state.

c) When a Flat appears it lowers the musical pitch of that note by half a tone. One plays the next key (black or white) to the left side of the note.

d) When a note is sharpened or flattened it remains in that state for the rest of the bar. Unless repeated, it does not affect the notes in the next bar.

This the basic theory that represents the traditional notation of today, which dates back to all the famous composers like Beethoven, Bach & Wolfgang Mozart.

PRIOR ART

A preliminary prior art patent search was conducted. Furthermore the applicant is intimately familiar with the prior art. Since the morpheus method was developed there have been many examples of various methods to teach music in order to make it more user friendly to the general population and are explained as follows. Following is a survey of the prior art patents listed in chronological order for ready reference of the reader.

a) Mahoney (U.S. Pat. No. 25,657) in the examples listed represents the notes instead of in the old traditional method as mentioned above with symbols on the musical staff and the letters of the notes depicted between 2 lines referred to as T & B. The length of each note is indicated by a set of new symbols created by Mahoney. These symbols are then placed beside the letters which represent the note length and the note to be played is shown with the letter. However, Mahoney is creating more symbols to indicate sharps, naturals, flats, semibreves, quavers etc and while the method separates both the Treble & Bass Clefs there is no structure for the student to follow with traditional type symbols being just substituted with new symbols. There is no reference to what fingers are to be used to play these specific notes and difficulty in what specific notes to be played is also evident.

b) Winners (U.S. Pat. No. 41,013) there is again great difficulty in reading the method mentioned where the Bass Clef is to the left and the Treble Clef to the right as shown in FIGS. 1 & 2 respectively. The strips mentioned are said to be placed on a key instrument or melodeon indicating a diagram of a certain scale. Still no reference to the fingering used to play these notes along with no certain structure as to how to overcome notation for complex pieces of music.

c) Eschemann (U.S. Pat. No. 566,388) a diagram of a keyboard is shown which contain the letters of the natural (white keys) and the sharps/flats (black keys). He numbers the keys referring to the black keys as the same number of its natural state key example 1=C, 1=C#. No reference to a structured musical staff nor to the fingers of the musician. Within FIG. 1 Eschemann represents the Autoharp with the strings labelled with their exact letters and again with the numbering system indicated earlier.

d) Guildford (U.S. Pat. No. 608,771) indicates each octave numbered 1–12 and these notes are then associated with no stable structure and also do not indicate which fingers to play specific notes.

e) Shires (U.S. Pat. No. 881,085) represents a method whereby the length of each note is indicated by the number and also reference to standard musical clefs, the words depict where in the scale the notes represent. This method is creating more symbols with no relevant structure and no reference to fingers of the hand.

f) Kraft (U.S. Pat. No. 1,009,671) displays a method where a musical staff is depicted and the fret numbers in relation to each string is shown to help the student identify the frets on a violin but doesn't form a structure to help the student see which string these frets are on. Also no indication as to what fingers to play these notes are mentioned.

g) Lazard (U.S. Pat. No. 1,133,074) displays the broad concept of numbering the fingers and thumbs of both hands from 1–5. The notes to be played are displayed in traditional notational format and the finger numbers are placed below each note within the format. The left & right hand are displayed on a complete staff of five lines where the numbers are placed above and below the musical staff but both fingers of each hand are associated with different notes and the structure is confusing because of the repetitive numbers of 1–5 along both the top and bottom of the musical staff.

h) Kinney (U.S. Pat. No. 1,200,367) displays a method whereby a staff is used having spaced lines to provide spaces representing the strings of the instrument and notes having heads of various shapes for indicating the fingers of the hand used for fingering the strings, the positions of the notes on the staff lines indicate the positions relative to the frets of the fingerboard on a violin. The method is very similar to traditional notation and proves equally complex when reading the notation.

i) Miller (U.S. Pat. No. 1,473,495) shows again the broad concept of numbering the fingers of each hand and lines of the musical staff depicted as the black keys of the piano. The spaces indicate the white keys. The structure is very complex and with regard to complex pieces of music is not manageable or useful.

j) Glenn (U.S. Pat. No. 3,331,271) shows the concept of displaying the notation on a staff consisting of a single line. The line is a reference for a single octave with the notes of the octave represented in spaces within the lines. Glenn does not separate notes played with both hands nor are the fingers of the hands indicated to show what fingering is to be used to play the notation.

k) Leonard (U.S. Pat. No. 3,733,956) displays a slide rule in order to teach music. Any single key or note is not labelled with the same number within this method in regards to finger co-ordination and no structure or staff is shown to play specific parts of the piano.

l) Cromleigh (U.S. Pat. No. 3,741,066) utilises a method whereby the use of identical staves which correspond to octaves are displayed. Again as was the case with (U.S. Pat. No. 25,657) the use of new symbols created by Cromleigh indicate semitones either higher or lower than the tone defined. No reference to the fingering used to play these notes is made.

m) Leonard (U.S. Pat. No. 3,822,630) creates a device for teaching musical relationships and notation in regard to scale tones & chords. The use of the traditional musical staff is indicating the notes played while numbering the fingers is only covering a few notes within a certain scale.

n) Leonard (U.S. Pat. No. 3,890,875) depicts a slide rule for teaching the relationship between notes, note names and the corresponding keys on a piano. Left and right hands are numbered 1–5 where the broad concept of numbering the fingers using a mirror image of the hands is created. A five lined musical staff is depicted but the notes are not indicated on the musical staff.

o) Lenoard (U.S. Pat. No. 4,041,828) displays another slide rule for teaching chords and scales. Again the use of the broad concept of numbering the fingers is shown. A musical notation structure is not evident nor are the numbers of the keys of the piano.

p) Schmoywer (U.S. Pat. No. 4,480,521) shows a method which teaches the fingering for chord triads in the root, first, second positions so as to play chord triads in the space of a single octave. FIG. 1 shows different displays of chord structures and the numbers of the fingers used to play them. However there is no reference to a musical notation sheet displaying what notes are to be played. Simply just showing what fingers to use to play a list of chords much like standard guitar chord books which show which frets to hold down to play an encyclopaedia of chords.

q) Bui (U.S. Pat. No. 5,574,242) refers to a method in which coding or indexing songs according to their highest and/or lowest sung notes and the corresponding keys or tonalities is proposed. Numbers 1–12 are used. No reference to a musical staff or what notes are represented or what fingers are used in reference to the notes.

r) Moberg (U.S. Pat. No. 6,015,947) mentions a method of teaching music utilising traditional musical theory elements in order to teach the method. No reference to what fingers are to be used to play these notes.

s) Bermudez (U.S. Pat. No. 6,388,182) explains an idea that involves the age old concept of numbering the fingers 1–5 for the left hand and creating a mirror image of that hand and numbering the right hand 5–1. Within this idea a single staff line is used and the fingers used to play the notes are depicted either side of this single staff line denoting left or right hand. A music sheet is also used to represent a small diagram of one octave of a piano with the correct finger numbers applied to the keys as used in FIG. 1. Along with this the music sheet contains the correct fingering according to the invention on either side of the staff line. The following can be seen as several disadvantages to this method of teaching music to people.

1. The staff line separates the left and right hand but the way the music is depicted above and below the line is very difficult to follow as there doesn't seem to be any solid structure around the numbers. It appears that the mind has to create the structure to follow the numbers. As an example in primary school children reading from a blackboard without the ruled concept it would be very difficult for children to follow. Even adults would find the method difficult to follow.

2. It appears that every time a new tune needs to be learned by the student a new diagram of the keyboard octave is given to the student along with the correct fingering according to the invention for this tune only. Only the labelled notes i.e. 5,4,3,2,1,2,3,4,5 in FIG. 1 (14) are to be used. At maximum one octave is all the notation covers at any one time and mentioned in line 6 (Detailed Description of the preferred Embodiment) "The selection of which set of ten keys of the eighty-eight available determines the octave and musical key of the song being played". This idea of creating sets of numbers i.e. 34, 36 to specific keys or octaves as shown in FIG. 3A is creating more numbers for the student to learn.

3. In respect to FIG. 5 as an example the tune "Jingle Bells" is laid out in the inventors format. However, the correct method of playing Jingle Bells is to play the melody with the right hand and the accompaniment with the left hand. The invention is using the idea of playing the full melody with both hands beside each other which should only be played with the right hand. The mirror image mentioned in Line 58 (Detailed Description of the preferred Embodiment) is an incorrect way of teaching a student. The piano of all instruments requires the mind to separate what's played with both hands. For example this applies to the drums also where a drummer needs to apply the same method of separating what's played with either hand and to what their feet are doing.

4. All things considered the student is still under the control of what the tutor/teacher gives them in regards to specially laid out music sheets. The student cannot learn a pop tune they like from the radio unless it is given to the student in the inventors format. This is a major disadvantage because the teacher/tutor is still part of the student learning process so this leads to an age old problem 'if you have a dreadful teacher/tutor you will have a dreadful student'. The child is totally dependent on the teacher/tutor on how fast they progress in their learning.

5. The method applies to one octave at a time unless the octave/key signature idea is used as shown in FIG. 3A. This in a sense puts a limit on what the student can learn and multiple octaves especially those used in classical music would require to learn many sets of numbers and depict them on the piano.

6. When a student plays a piece of music if the student needs to change the finger to reach a different note the notation cannot depict this as the 5,4,3,2,1, is only used in the notation. The dexterity of the students ability does not grow because they are using two hands to play simple melodies which should initially be learned with the right hand only, so chord structures can be used when introducing the left hand.

7. The child has to eventually learn the traditional musical theory of an instrument and in a way the invention opens the student to learning simple melodies at the beginning with both hands incorrectly and then the labyrinth of musical theory is dropped on them.

8. Sharps & Flats are depicted on the music sheet as shown in FIG. 5 with their correct symbols. This is adding more symbols for the student to learn. The return to Naturals of notes is not mentioned when sharps/flats are applied, so again more symbols are applicable.

9. When a child begins to play the keyboard the right hand should be initially only the melody of simple songs, but not according to the Bermudez method of teaching. The child does under her method acquire the feel of playing a melody with the two hands together, but in order to play the melody in the proper way, requires the student to re-learn the music the second time around i.e., the melody with the right hand and the accompaniment with the left hand. Melody involves many notes so a child because of his schooling will naturally look to the top of any reading material that is given to them. Every single thing a human does when using our eyes to read involves our eyes instantly looking to the top and working our way down. In children's comics for example: the captions within each section are laid out in a top-bottom format so a child can follow what the characters are saying. In Bermudez method the student automatically looks to the top of what they read which in turn leads a student with no choice but to adapt to the notation where ie, 5,4,3,2,1 of the melody line is bottom-top. In other words 1=thumb, 2=index finger etc. On "Away in a Manger" in FIG. 1 (10) requires the student to read the notation from pinkie finger=5 back up to the thumb=1.

The student can only go so far with the method and the necessity to learn traditional musical theory is imperative in order to progress. At any rate none of the prior art devices known to the applicant or his attorney disclose the EXACT embodiment of this inventor that constitutes a simple, elegant, secure, flexible, convenient, affordable means for this system.

OBJECTIVES

Unfortunately none of the prior art devices singly or even in combination provide for all of the objectives as established by the inventor for this system as enumerated below.

1. It is an objective of this invention to provide methods, devices and system for learning and teaching of key, string, wind and percussion musical instruments through a simplified morpheus music notation system.

2. Another objective of this invention is to utilize a revolutionary music notation system that enables children, adults, elderly & the blind to learn any musical instrument without the prior knowledge or prerequisite to learn the traditional and prior art music notation theory.

3. Another objective behind this new type of notation is that people learn instantly exactly what fingers to use in the butterfly effect when taking up an instrument and the window of creativity continues because of no requirement to ever learn standard musical theory of any level.

4. Another objective of the invention is to provide a teaching method and music sheet where the structure involves the traditional notation being combined with the Morpheus Notation Clefs which enables the student to see what is happening in traditional notation when they are playing the Morpheus Notation system. The structure is simple to follow where the exact numbers of the keys are represented on both clefs with the correct fingering laid out. There is no need for the teacher/tutor to re-organise the fingering of the keyboard every time a new song needs to be learned. The Rama Clef (Right Hand) contains F, G, H, I, J which starts at the top-down which is instantly recognisable in regards to reading from the top-down. The idea centres around the depiction of a sort of butterfly effect across both clefs 5. Another object of the invention is to provide a teaching method and music sheet where there is no limit to the amount of octaves to be represented on both clefs which is so important when students begin to learn classical piano music. Chord progressions, complex piano solos requiring the full length of an eighty-eight note classical piano using both hands and the ability of the left hand operating at the melody section in some cases of classical music is totally manageable.

6. Another object of the invention is to provide a teaching method and music sheet where the invention will become so useful to music publishing companies that the notation will appear for popular songs. The idea of a student about to begin playing the instrument will search consistently in the stores for this unsophisticated method. This leads to what I think should be the initial goal of anyone learning an instrument 'to learn the instrument without the help of tutors or teachers'. This is where I believe the creativity involved in playing an instrument comes into play. The student is not under the control of any teacher/tutor and because the method is so easy adults and the elderly will begin to pick up the idea of playing an instrument.

7. Another object of the invention is to provide a teaching method and music sheet where the full audio spectrum of all instruments revolves within the eighty-eight notes of a piano hence all the notes can easily be represented on both clefs in the correct fingering method instantly.

8. Another object of the invention is to provide a teaching method and music sheet where the student is instantly learning the fingering co-ordination involved in playing the keys on the piano. This will develop their mind which leads to experimentation in playing the instrument. No strict line on how far the student can progress and because of the ease of the Morpheus Notation method their ability will develop at a very fast pace.

9. Another object of the invention is to provide a teaching method and music sheet where the student never requires the need to learn traditional musical theory of any level. I believe, this is the only way that new ideas will develop in a students mind where traditional musical theory requires the student to follow a strict set of rules i.e., that some notes, chords cannot be played over each other. With no boundaries using Morpheus Notation the mind will develop new ideas in playing an instrument in a sense being able to step outside of the norm.

10. Another object of the invention is to provide a teaching method and music sheet where there is no use of sharps/flats/naturals symbols in Morpheus Notation. Only represented on the traditional Musical Clefs (Treble/Bass Clefs) above the Morpheus Notation within the Anubis Tree. The black keys in the notation with its numeric value is indicated in bold font and the standard white notes in normal font. This helps the student differentiate instantly the black notes from the white notes i.e., 41=C3#; 40=C3.

11. Another object of the invention is to provide a teaching method and music sheet where the Rama Clef on the Morpheus Notation depicts exactly how humans read with the brain i.e., top-down. No complications where the notation adapts to people instead of the reverse.

12. Another object of the invention is to provide a teaching method and music sheet where the method is adaptable to every instrument in the world today and to instruments that have not even been invented as of yet because the base or origin of the notation revolves around the scale of the music audible spectrum that covers the human hearing range and this base is always to be used to create each type of technique whatever the instrument.

13. Another object of the invention is to provide a teaching method and music sheet where the method increases the hearing ability of the student and also creates unknowingly to the student a type of internal tempo/sync clock within the brain which leads to unprecedented natural rhythm.

14. Another object of the invention is to provide a teaching method and music sheet where adults will be encouraged to learn a musical instrument in a simple environment which otherwise under present methods of teaching instruments to people prevents them from doing so.

15. Another objective of this invention is that it be versatile enough to include all types of musical instruments such as wind instruments, brass instruments, stringed, bowed, percussion, keyboard, organ, electronic and the global collection of unusual instruments could benefit from this new type of notation. The idea can also be applied to a laid out system of movements from a conductor of music. When fully trained the qualified conductor can bring his own method into play i.e., creativity. Even the trainee conductors could be taught the initial system in a simple way where different hand movements assigned a specific number create various expressions on the music. These specifically assigned numbers could then be placed on the music sheet to determine the expressional or emotional changes taking place, while the music is being played by the orchestra.

16. Another objective of this invention is that it obviates music tutors, teachers etc., such that self teaching children, adults, elderly etc., an instrument is practical.

17. Another objective of this invention is that even the blind can self teach a musical instrument in conjunction with Braille.

18. Another objective of this invention is that it can be popularized and maintained with ease.

19. Another objective of this invention is to make it suitable for users of a broad range of ages and situations.

20. Another objective of this invention is that its use requires no additional training or skill on the part of the student or the teacher.

21. Another objective of this invention is that it be capable of multiple uses in music.

22. Another objective of this invention is that it use little or no additional energy except the normal human energy of the user.

23. Another objective of this invention is that the invention be intuitive user friendly 24. Another objective of this invention is that it be environmentally friendly and use materials which are harmonious with the environment 25. Another objective of this invention is that it be safe in normal as well as unusual situations.

26. Another objective of this invention is that the devices and components of its system be strong, long lasting and made from durable materials.

27. Another objective of this invention is that it meet all international federal, state, local and other private conventions, standards guidelines, regulations and recommendations with respect to safety, environment, energy consumption.

Other objectives of this invention reside in its simplicity, elegance of design, ease of manufacture, service and use and even aesthetics as will become apparent from the following brief description of the drawings and the detailed description of the concept embodiment.

Unfortunately none of the prior art devices singly or even in combination provide all of the features established by the inventor for this system as enumerated below.

a) Affordable and Cost effective
c) Easy to learn and teach
d) Intuitive
e) User Friendly
e) Easy to manufacture, use and maintain.
f) Suitable for people of all ages and gender in all types of situations.
g) Easily adaptable for other uses

BRIEF DESCRIPTION OF THE DRAWINGS

These objects and features of the invention shall now be described in relationship to the following drawings.

a) FIG. 1 shows a classical piano layout 10 and the numeric value of each key b) FIG. 2 shows a morpheus music sheet vis-à-vis a standard scale.

c) FIG. 3 shows a complex piece of music for the guitar and corresponding Morpheus Guitar Notation.

d) FIG. 4 shows a diagram of a clarinet along with how the Morpheus Wind Notation could be adapted for a wind instrument.

DETAILED DESCRIPTION OF THE BEST MODE PREFERRED EMBODIMENT

Figure 5:
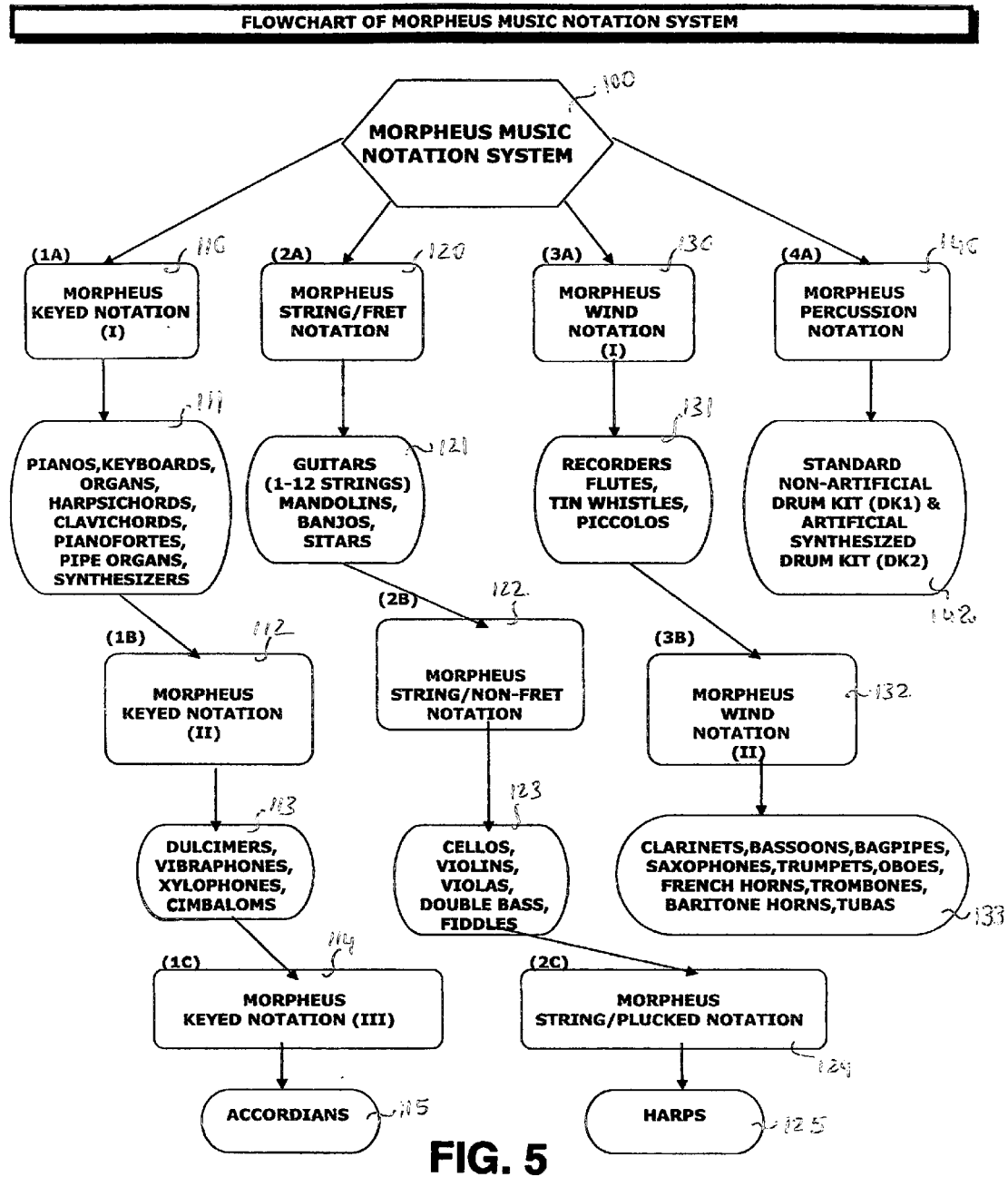
FIG. 5 is flow chart of the morpheus music notation system as applied to key, string, wind and percussion instruments.

The foregoing and other objects, aspects, uses and advantages of the present invention will be more fully understood from the following detailed description when viewed in conjunction with the accompanying drawings in which FIG. 1 shows a classical piano layout 10 and the numeric value of each key 12, and FIG. 2 shows the music sheet 18, 20, 22 and 24 from Morpheus Notation and how it could be used to display a difficult piece of music, the example shown being "Bohemian Rhapsody" by Queen. Also depicts a standard scale represented on a music notation sheet. Also shows how the letters are laid out in regards to the fingering of the hand 14 and 16 and how it applies to the Morpheus Notational staff 18 and 20 using the butterfly effect 26. Also shown is a standard example of the traditional Guitar Tablature 32 being used in the world today and includes the notation sheet proposed for Morpheus Guitar Notation 34 indicating the differences in the traditional and the proposed new invention.

FIG. 3 represents a complex piece of music for the guitar is also shown and how it could be represented on the Morpheus Guitar Notation music sheet. FIG. 4 shows a diagram of a clarinet 40 along with how the Morpheus Wind Notation could be adapted for a Wind instrument 50 and 52. Shows a music notation sheet for Morpheus Notation for traditional musical clefs i.e., Bass & Treble Clefs 22 and 24, Morpheus Key Notation for a Key instrument i.e., Leda & Rama Clefs 18 and 20, Morpheus String Notation for a Stringed instrument 34, Morpheus Wind Notation for a Wind instrument 50, 52 and 54 and Morpheus Percussion Notation for Percussion instruments 58. Also shows how the letters are laid out in regards to the fingering of the hand 14 and 16 and how it applies to the Morpheus Notational staff.

The 'Morpheus Notation System of this invention enables children, adults, elderly & the blind to learn a musical instrument in a revolutionary way, where all the notes are arranged in a simplistic method. There is no condition to learn traditional musical theory to use the method. Person learns the instrument in a non-complex way where the idea can be applied to the absolute variety of worldwide instruments across the music spectrum. From 22 and 24 in FIG. 2 you will see that the musical stave components of 10 lines (5 for Bass Clef/5 lines for Treble Clef) have not been altered. However, they are no longer referred to as notes where 18 and 20 signify the specific fingers of the left & right hands which are laid out in a butterfly effect as indicated in 14, 16 and 26. Humans unconsciously look to the top of any reading material given to them. It's an automatic response that is learned at a primary age where we read 'the black board from the top-down'. Also the occurrence of the black notes are indicated on each type of notation by having the numeric value in bold font instead of standard font i.e., 28=C3 29=C3# as shown in 70. In 72 this shows how chords are represented on each type of tablature. The symbols of traditional music notation are replaced with the exact numeric value 28 of the 88 notes on a classical piano. The piano is the base instrument of all musical instruments where the A0 (first note) and C8 (last note) cover the frequency range of all musical instruments. This idea can then be transferred to the notation of all other instruments. The Alphabet & Numbers create a simple environment which opens the music creativity window. The enormous difference however with the traditional method is that the Morpheus Music Notation system teaches the person unsuspectingly learning the instrument how to create music with the help of their minds and their hearing. Rules of traditional music notation stifle a persons imagination in an incredible way because of the rules set out thousands of years ago, but because of the non-complex idea of Morpheus Music Notation System it allows the mind to wander which then leads to creation.

Solution to Problems of Prior Art Music Notation.

In 22, 24 and 30 shows the difference in traditional notation of today and applicant's new method 18, 20 and 28 referred to as Morpheus Music Notation. Reference numbers 28 on the newly titled clefs of 'Rama Clef' (Right Hand) 18 & the 'Leda Clef' (Left Hand) 20 indicate the exact keys that are depressed on a full length 88 note classical piano 12. The Stave Lines A, B, C, D, E (Left Hand) 20 & J, I, H, G, F (Right Hand) 18 teaches the person instantly what fingers to use with these notes and also in regards to the butterfly effect 26 which represents how humans naturally read literature. To signify chords a border is placed around the numeric values as shown in 72. Humans have an audible range from 20 Hz–20,000 Hz. Above the C8 (4186 Hz) are the natural occurrence of harmonics in instruments, some can be controlled for instance guitar, others occur naturally and because the piano 10 is the instrument in the audio spectrum, where the first note A0 resonates at a frequency of 27.5 Hz and the highest note C8 resonates at 4186 Hz all other instruments resonate within these ranges.

In all teaching in present times the fingers are numbered 5, 4, 3, 2, 1,:1, 2, 3, 4, 5. The idea centres around in picturing a mirror image of both hands to help the student. However, when a student is playing the piano in order to be a master of the instrument it requires both hands to be totally independent of each other. Have referred to the method as Morpheus Notation because the idea is metamorphic where it can be applied to all the global instruments. The word Morpheus encapsulates the concept as envisioned by the inventor.

The Anubis tree combines the traditional notation method 22, 24 and 30 with my new method 18, 20 and 28. This enables people to have choice and by including the traditional method on top, this helps people to become accustomed to the new method, especially for people who have spent years learning in the traditional way already. But they would start the new method from the very beginning and start afresh again to begin the musical creative journey. A grid 74 is also added to the Anubis Tree to enable the person to see the tempo involved when these notes are pressed on the classical piano. It will consist of vertical lines 74 indicating each beat within the bar and lighter additional vertical lines if applicable to show the breakdown of these beats within the bar. The top down morpheus method of teaching and learning a musical instrument has the potential to revolutionize the way people learn music. More people will be taking up the task of learning an instrument whatever their age.

Braille systems can be applied to each type of technique for various instruments, where the notation adapts to the instrument, not the traditional way that instruments adapt to the notation. New instruments that are invented will be immediately adaptable to the notation as the structure sees it, the boundaries are infinity. Because the idea is numbers & alphabetically based it will be easy for instrument manufacturers to apply Braille to an instrument indicating the specific range of numbers on a certain instrument, in a clear & terse manner. Every type of instrument i.e., Key, String, Wind, Percussion, etc., will have a different method, which will make it simple for music publishers to print books and music sheets specifically for playing exclusive instruments like clarinets and flute to name a couple. The student can comprehend it instantly and not spend years learning the theory of traditional music notation. This in turn will develop their own ideas because they are feeling within themselves what they are playing which will bring about new ways of playing an instrument. It will negate the vision of seeing musicians stare into traditional music sheets while playing in concerts. They will be able to adapt to any type of music which is a huge advantage to a child who is learning classical music, for they will be able to play standard music that they see in music videos on MTV for example. This will in turn develop better musicians, better music standards and even maybe the possibility of another Wolfgang Mozart. The one difference however is that Wolfgang Mozart could picture his music in his head before he even played it and had it calculated in his mind how he would like it to be.

The new Mozart will create on what they are feeling inside which is much more powerful. An example of this is how the famous composer Vangelis writes soundtracks for movies. He sits in front of the screen watching the film and composes the music there and then by judging the emotions of what the actors should or could be feeling at that very moment. Women will begin to get to the standard & innovation of their male counterparts. As is the case nowadays, if someone were to ask who are the best drummers, guitarists, composers, bass players etc., in the world at the moment? You unfortunately only think of man. Because of the freedom of the mind women will begin to create on an ingenious level which can only be good for music.

Development of Morpheus Notation for Music Publishers.

a) Stage I: Traditional sheet music obtained along with the disc for the piece of music.

b) Stage II: Transfer all traditional notation into the specific keys on the classical piano 10 i.e., whether note is C5 or a D5 on the classical piano 12.

c) Stage III: Use the full 88 note classical piano layout 10 to number the specific keys on the piano 12 i.e., C5 changes to 52, D5 changes to 54, taking into account what fingers are used to play these notes 18 and 20.

d) Stage IV: Add both the Leda 20 Rama 18 Clef of Morpheus Notation to the Bass 24/Treble 22 Clefs of traditional music notation, now referred to as the Anubis Tree 22, 24, 30 & 18, 20 and 28.

e) Stage V: Numbered key notation 28 from the exchange in stage three is used and placed as specific numbers 28 of the classical piano 10 on both the Leda 20 Rama 18 Clef. The exact fingers used to play these notes i.e. whether C5 was played with left index finger etc is placed on the correct line in reference to the fingers of the hand 14 and 16.

e) Stage VI: The person who reads the music uses the Morpheus Notation 18, 20 and 28 only and listens to the how the music is played ignoring the traditional notation above it 22, 24 and 30.

As can be gleaned from the accompanying drawing FIG. 5 the Flowchart delineates the different techniques applicable for the Morpheus Music Notation System to the list of instruments as mentioned above is further explained as follows:

a) Morpheus Keyed Notation I (110)
b) Morpheus Keyed Notation II (112)
c) Morpheus Keyed Notation III (114)
d) Morpheus String/Fret Notation (120)
e) Morpheus String/Non-Fret Notation (122)
f) Morpheus String Plucked Notation (124)
g) Morpheus Wind Notation I (130)
h) Morpheus Wind Notation II (132)
i) Morpheus Percussion Notation (140)

Morpheus Keyed Notation (I)

Reference: Pianos, Keyboards, Organs, Harpsichords, Clavichords, Pianofortes, Pipe Organs & Synthesizers. Within this technique a music notation sheet is created where the above list of instruments is to be represented on the Leda (Left Hand) & Rama (Right Hand) Clefs. Each clef consisting of 5 lines each where these lines are directly related to the finger configuration as mentioned in the Butterfly Effect. The exact numeric value of the note or key is placed on the lines of either clef depending on the specific finger used to play the numeric value i.e., note or key on the instrument. Letters A, B, C, D, E, F, G, H, I, J in consecutive order are assigned to each finger which is directly related to layout of the Clef structure. This enables a novice to understand instantly which note/key to press and with what finger configuration. With respect to Pipe Organs or other similar instruments an advancement on this technique could be where one could also develop an idea whereby the extra keyboards say for example those used with Pipe Organs where a possible set up of up to seven separate keyboards or more are assigned a number or letter (Manual Keyboards & Pedal Keyboards). This letter or number could be placed beside the numeric value of the note which would then indicate to a novel person the relevant keyboard the note is to be played from on the Pipe Organ.

Morpheus Keyed Notation (II)

Reference: Dulcimers, Vibraphones, Xylophones, Cimbaloms. Within this technique a music notation sheet is created where the above list of instruments is to be represented on two separated lines on a staff. Each line indicating a row of wooden blocks (xylophones); strings (dulcimers, cimbaloms); metal bars (vibraphones) which are laid out. Both hands use hammers independently or in unison to strike the wooden blocks for example: xylophones. So an additional row of wooden blocks would be represented by another line within the staff to indicate a third or more supplementary rows of wooden blocks. Each wooden block in the xylophone example is assigned a numeric value or letter which is then placed on the relevant line on the staff to indicate the correct wooden block to strike within the correct row of blocks. This enables a novice to strike the correct wooden block, string, metal bar within the correct row of wooden blocks, strings & metal bars. An advancement of this idea could also lead to a letter or number being assigned to both hands. So A=Left Hand & B=Right Hand where this letter is then placed beside the numeric value on the line within the staff, which would then help even further so a novel person would know which hand to use to strike the wooden blocks, strings, metal bars. The wooden block is used only as an example, so the idea also applies to Dulcimers, Vibraphones & Cimbaloms. In all cases within the technique the first/top line on the staff indicates the uppermost row of strikable blocks etc which makes it simple for a novel person to read as in the Butterfly Effect on how people view reading material i.e., top to bottom.

Morpheus Keyed Notation (III)

Reference: Button & Piano Accordions or similar instruments. Within this technique a music notation sheet is created where the above list of instruments is to be represented on two separate clefs where the right side (melody) of the accordion or similar instrument and its relevant note/keys/buttons are indicated by the exact numeric value of this note. It relates to where the note is represented by the layout of the classical piano as explained in Morpheus Keyed Notation (I). Accordions are arranged in categories according to the amount of buttons they contain on the left side (accompaniment). 12 bass (=12 buttons) and all the way up to 120 bass (=120 buttons). To explain the idea further the 120 bass will be used as an example. Because the left side (accompaniment) of the accordion is relatively different in its layout to the right side (melody) the second clef would contain 6 lines i.e., 6 rows of buttons available on left side of the 120 bass accordion and each row contains 20 depressible buttons (20×6=120). Each button within each row is assigned a letter or numeric value for example 1–20. This numeric value is then placed on the relevant line on the clef where the innermost row of buttons is referenced to the uppermost line on the clef and outermost row of buttons is the bottom line on the clef. This again is using the Butterfly Effect in how people view reading material but the reverse of how the buttons are represented on the clef is also true. This enables a novel person to view the correct button/key on the correct row of buttons on the accompaniment side and the correct note/key on the melody side with the correct finger configuration as used in the Rama (Right Hand) Clef in Morpheus Keyed Notation (I). An advancement of this idea is where the fingers of the left hand are named with the letters or numbers i.e., A, B, C, D, E in consecutive order and then this letter placed beside the numeric value on the Left (Accompaniment) Clef, thus a novel person would then know which finger to use to play the buttons on the Left side of the accordion.

Morpheus String/Fret Notation

Reference: Guitars (1–12 Strings), Mandolins, Banjos, Sitars. Within this technique a music notation sheet is created where the above list of instruments is to be represented on a stave or staff of 1–12 lines which is directly proportional to the amount of strings the instrument has. The numeric value of the fret is placed on the relevant line on the staff in relation to the specific string. Each technique is to be developed where the top line on the staff represents the specific string that a novel person sees when looking down on the instrument while being held as in the Butterfly Effect. This idea creates the top-bottom view of reading material. Each finger is named with a letter or number i.e., A, B, C, D, E, F, G, H, I, J in consecutive order and then this letter is placed beside the numeric value of the fret. This enables a novel person to pick up a fretted stringed instrument for the first time and using the music sheet created reads the sheet from top-down so the uppermost line on the staff is the top string they see when looking down on the instrument, the numeric value of the fret informing the novel person of the correct fret and the letter as assigned in the finger configuration informs them of the correct finger to use to play the fret.

Morpheus String/Non-Fret Notation

Reference: Cellos, Violins, Violas, Double Bass, Fiddles. Within this technique a music notation sheet is created where the above list of instruments is to be represented on one clef and the amount of lines within the clef is directly related to the quantity of strings on each of the above mentioned non-fret instruments. As an example the violin contains four strings thus it is represented on a staff of four lines. Each note within the scale of each string on the violin is assigned the exact numeric value it relates to on how the note sounds on a classical piano layout. This numeric value is then placed on the line indicating the relevant string and with the finger configuration chart i.e., A, B, C, D, E, F, G, H, I, J the letter is placed beside the numeric value within the staff lines. A compact disc or cassette is then produced with the complete scale of each string and how it should correctly sound as is the difficulty in playing non-fretted instruments. The author of the compact disc or cassette for example would quote "40" i.e., which is the $40^{th}$ key on the classical piano and this tone is then played from the violin. These kinds of instruments are played with a bow in order to make the tone or sound from the violin so the breathing movements used in Morpheus Wind Notation (II) could be applied here where an analogy of the bow movement could be related to breathing movements where <=inhale: the bow is pushed over the strings of the violin to the left and >=exhale: the bow is pushed over the strings of the violin to the right. These two symbols "<, >" could be placed either above the numeric value or above the staff to indicate bow movement over the strings of the instrument. Sometimes the fingers are used to pluck the strings of the violin, so the symbols would not be placed above the numeric value thus informing the novel person not to use the bow to play the specific note. In all ideas for the technique the Butterfly Effect is used in how the staff lines are structured in that when a person holds the violin the left hand is spread across the strings from right to left so the string to the right of the instrument i.e., "G" is the uppermost line on the staff. All the above would enable a novel person to play the correct note with the correct finger configuration and correct bow movement.

Morpheus String/Plucked Notation

Reference: Harps or similar instruments. Within this technique a music notation sheet is created where the above list of instruments is to be represented on the previously mentioned Leda (Left Hand) & Rama (Right Hand) Clefs as used in Morpheus Keyed Notation (I) because the Harp is an instrument that is played with both hands as are keyboard instruments. Each of the two clefs within the staff would contain as before five lines each. The finger configuration of naming the fingers of each hand with letters or numbers i.e., A, B, C, D, E, F, G, H, I, J and the use of the Butterfly Effect in relation to how these letters relate to each clef is applicable. Many harps have a range of about two octaves or more but the exact numeric value the string relates to on the classical piano layout is used. This numeric value is then placed on the relevant line of each staff in reference to finger configuration used to play the specific string on the harp. This enables a novel person to see using the music sheet the correct string to be played and with the correct finger. An advancement of the technique could display an idea whereby the upper, middle and lower part of the harp are named with any letters for example: U=Upper M=Middle, L=Lower respectively or with numbers. These letters or numbers are then placed beside the numeric value of the note on the line within the staff because the harp can produce different harmonics on different areas of the string. This would help a novel person to play the correct numeric value on the correct area of the specific string. Any numbers or letters could be used to display the idea where the harp could be split into several sections to indicate a specific area on the string. Another advancement on the technique could be where the breathing movements as used in Morpheus Wind Notation (II) could be applicable i.e., <=inhale: string is plucked toward the body and >=exhale: string is plucked away from the body. These symbols "<or >" are then placed above the numeric value or above the staff so a novel person would be able to see which direction the strings of the harp are being plucked. Other use of several different symbols could be used to indicate same.

Morpheus Wind Notation (I)

Reference: Recorders, Flutes, Tin Whistles, Piccolos. Within this technique a music notation sheet is created where the above list of instruments is to be represented on one clef and the quantity of lines on the staff is directly related to the amount of holes on the instrument covered by the fingers of each hand. So for example a tin whistle has six holes so the clef would have six lines. Another single line is then added to the staff separate from the other six lines. The note played on the tin whistle is directly related to the exact numeric value it represents on the classical piano layout. This numeric value is then placed on the single line and the finger configuration idea where the fingers of the hand are named with letters or numbers i.e., A, B, C, D, E, F, G, H, I, J. The relevant letter in what fingers are covering the holes are then placed on the relevant line where the top line on the staff represents the uppermost hole on the tin whistle when looking down on the instrument when playing it. This enables a novel person to see what hole is being covered, with which fingers. An advancement of this technique could also include the breathing movements used in Morpheus Wind Notation (II) i.e., <=inhale and >=exhale. These symbols are then placed above the numeric value or above the staff to indicate the breathing movement involved in playing the note on the tin whistle. The clef could be separated by three lines each indicating the upper three holes on the tin whistle and the lower three holes on the tin whistle, but ideally the 6 lines should be on the clef together.

Morpheus Wind Notation (II)

Reference: Clarinets, Bassoons, Bagpipes, Saxophones, Trumpets, French Horns, Trombones, Baritone Horns, Oboes, Tubas. Within this technique a music notation sheet is created where the above list of instruments is to be represented on two separate clefs within the staff and the amount of lines in each clef is directly proportional to the amount of depressible valves/keys or buttons on the instrument and the clef is split in two where one represents the left hand (upper clef) and the other for the right hand (lower clef). As an example a Clarinet would contain a staff of two clefs each clef containing twelve lines each i.e., the clarinet has twenty four depressible keys, through common knowledge of clarinets we know that twelve of them are depressed with the left hand and the other twelve are depressed with the right hand. Finally an additional single line is placed below the two clefs where the exact numeric value of the note on the clarinet represents the specific key on the classical piano layout. The twenty four keys of the clarinet are labelled 1–12 (left hand) and 1–12 (right hand) or 1–24 and the finger configuration where the fingers of the hand are named with letters or numbers i.e., A,B,C,D,E,F,G,H,I,J is used. The letters are then placed on the line that relates to the specifically depressed key on the clarinet. This enables a novel person to see what numeric value they are playing with reference to the classical piano, what keys are being depressed on the instrument and with the correct finger configuration. As before the advancement on the technique could also include breathing movements i.e. <=inhale and >=exhale, where the symbols are placed above the numeric value or above the staff to indicate breathing movements involved in playing the numeric value i.e., note on the clarinet. The clarinet is used as an example but the idea applies to all the above referenced instruments.

(4A)-Morpheus Percussion Notation

Reference: Standard Non-Artificial Drum Kit referred to as (DK1) & the Artificial Synthesized Drum Kit referred to as (DK2). Within this technique a music notation sheet is created where the above DK1 & DK2 are represented on a staff of six lines. Three lines are used to identify DK1 which should be heavier line font style compared with the three lines used to represent DK2. The six lines are just a guide and keeps the staff slender and easy to read, but more lines could be used, but ideally six lines is more than enough for both DK1 & DK2 to be represented on. DK1 refers to a non-artificial Drum Kit containing seventeen different percussive sounds that are available on standard drum kits that include a snare, hi-hat, cymbals to name a few. DK2 refers to an artificial Drum Kit containing a list of the many synthesized percussive sounds available on synthesizers of today. These two Drum Kits are represented on the full clef containing six lines or independently where for example a standard drummer would only need the notation sheet for the DK1 i.e., three lines, or vice versa in regards to DK2.

On the three lower lines a list of seventeen various percussive sounds are assigned a number or letter i.e., 1–17 in no particular order. These numbers are then placed on either of the three lower lines. This enables a novel person to see using the music sheet what percussive sound is being played and the timing involved using a structure involving bars of music in the form of a grid when exactly these sounds are played.

On the upper three lines a list of available percussive sounds synthetically created using a synthesizer are assigned a number or letter. These numbers or letters i.e., 18–400 are then placed on either of the upper three lines. This enables a novel person to see what sound is being played and using bars of music in the form of a grid when the sound is being played. An advancement of this technique could also display how the sounds are related within the stereo field especially applicable to DK2. For example a letter or number L=Left, C=Centre, R=Right. This letter is then placed beside the assigned number within the clef where this identifies to a novel person using the music sheet where the sound is originating from within the stereo field. Ideally an international standard list of synthetic percussive sounds from synthesizers could be created, much like the worldwide list of GM Sounds in relation to MIDI (Musical Instrument Digital Interface) that were created many years ago as a set standard for GM sounds. This would lead to international music notation books being printed under a set standard.

Advantages of Morpheus Notation

The applicant feels that the people who can change the way music is today DIY (Do It Yourself) who self teach themselves how to play a particular instrument. It is like going back to the idea when composers first started writing music when traditional notation began. There was no such thing as people teaching people how to play an instrument. You had to create the ideas on your own. Some of the greatest musicians, the world has ever seen began by teaching themselves how to play an instrument i.e. Wolfgang Mozart (composer), Edward Van Halen (guitar), Jimi Hendrix (guitar) & Mike Oldfield (assortment of instruments).

The advantages of this type of notation are endless. No requirement for musical theory, the technique is adaptable to suit any instrument, but with the base (classical piano) idea or the origin always used to form each type of technique. The window of creativity is opened on a profound level where boundaries have not been set which in turn gives the freedom to experiment.

However the one important breakthrough is that the blind will be able to learn any instrument with the use of this notation system. Braille can be inducted into the Anubis Tree, which will indicate the numbers and beats within the bar. Braille numbers can also be applied to the instrument with set guidelines on how to produce these sets of numbers. Children once shown the method will not need the presence of an adult or tutor and more people will begin to learn instruments because of the simplicity of the idea.

In all the above techniques mentioned the central idea where a tone or key on a classical piano is referred to as its direct numeric value between 1–88 on the classical piano layout and this numeric value is then placed on the relevant staff is crucial to the structure of Morpheus Music Notation System. The idea of using the finger names to identify the lines on each of the clefs is an ideal way of creating s simple structure for music. One could also place the key value on the relevant staff i.e. instead of the numeric value of "40", "C4" or "C" is placed on the relevant staff, but in order for the idea to be developed across all the above instruments a set of numbers for the notes and assigned letters for finger configuration enables the structure to be created within a simple environment where you are not mixing letters with letters or numbers with numbers and the Butterfly Effect in how people view reading material is applicable. The numeric value on the classical piano could also be any set of consecutive or alternate numbers, letters, range of values which could be used instead of the above mentioned 1–88 and A, B, C, D, E, F, G, H, I, J. These values could also be placed on the spaces within the lines of each staff in each case, but having them on the line creates a simple structure to be viewed in a solid manner by a novel person for the first time. Any particular order could be involved in naming the finger configuration method with letters or numbers or other forms of labelling, but by naming them in consecutive order from left hand pinkie to the right hand pinkie when these letters are applied to the staff the butterfly effect in how people from primary age read books from left to right and top-bottom is an ideal way to create the notation system. In all the above cases the idea in how each clef is separated within each technique is a structure created specifically to enable a novel person to view a music sheet within a simple structure, but these clefs could be all joined together intermittently in any form, but doing this would render the structures difficult to read, thus the need for the separation of the clefs. Where the clefs are separated, one could also separate the clefs even more as is the example mentioned where the clef for DK1 & DK2 could be separated and viewed on a music sheet independently as just three lines for DK1 or another music sheet with three lines for DK2. The whole idea however revolves around separating the clefs to identify the use of the left hand independently from the right hand. Each technique has a grid of vertical lines placed over the clefs to identify bars in music. You could also have for example in Morpheus Keyed Notation (I) where just one staff is used on the music notation sheet given to the novel person to identify the notes only with a particular hand. This design is pointless as there are not many instruments that are always just played with one hand. However if there is a case for instance where a novel person had the loss of one of their limbs, well then this design would be adaptable in order for that person to enjoy playing music with just the one limb. The whole idea I envisage behind the Morpheus Music Notation System is that everyone has the right to learn a musical instrument, so just because a person has a certain handicap in their being should not prevent them from learning an instrument because the design of the structure of the notation system is adaptable to everyone's needs.

Advanced Applications of the Morpheus Music Notation System.

The following explains how this new type of notation method could adapt to different instruments. These are just illustrative examples of the possibilities that this new type of notation could give to the world.

| | |
|---|---|
| a) Application One- | Guitar (string) |
| b) Application Two- | Clarinet (wind) |
| c) Application Three- | Drums (percussion) |

Application One-Guitar (String)

Presently in the prior art is a tab system in place called guitar tablature 32 which dates back over a thousand years. Very simple system involving putting numbers to the frets 36 on the fretboard. However a colossal drawback with this method is that when looking at the tablature you are looking at the guitar frets upside down. Fortunately the Italians used the reverse idea, but it never somewhat dismantled the upside down standard it is today. You also now have ever decreasing ideas in regards to how to play the instrument because of the lack of interest in guitar based bands these days. Even though the tablature gets easy to read over four or five years it takes a very long time to get comfortable with it. Seems to be no structure to it as to how scales are played. A person who picks up the guitar for the first time still doesn't know what fingers to use when playing from the traditional tablature.

Complex guitar solos can take up to ten years to figure out all because of not knowing the specific fingers to use. As mentioned before children, adults etc should have easy access building blocks when deciding to take up an instrument and should not have to spend many years on figuring out how a certain piece of music was played. If a method was already in place, the person would instantly know how it's being played, which will then lead to time to create other ideas on playing the instrument.

In 32 there is a diagram of the traditional guitar notation system and the idea transferred to the Morpheus Guitar Notation idea for guitar in 34. The butterfly effect 26 in the way people read material is functional and now that there has been a major advancement over the last 40 years in the guitar, the person learning the instrument should not find it difficult to read. Even with several tricks like two hand tapping etc., shown in 76 the possibility of informing the musician of what fingers 16 to use is not trivial when it comes to Morpheus Guitar Notation. At a glance the person knows what fret to play 38 when they are looking down while playing, i.e., the specific strings 34. The displayed finger values 16 let the person know how that piece of music was played. Some musicians even use both their thumbs to play different frets so the dexterity of a person will grow much quicker in a correct method, which is of the utmost importance. No longer is a guitarist sitting down for hours with a complex piece of music on what fingering was used, this in turn leads to a better musician and a happy musician, who does not give up at the smallest hurdle. This instant method develops the people's ability much faster, which they can then build upon after learning the base.

In regards to all other non-fretted stringed instruments for example: the violin, cello the above method applies where the numeric value of the note 12 is placed on the specific string 38 within the staff. In relation to a violin for instance because it has only four strings, then only four strings appear on its staff within Morpheus String Notation and as mentioned earlier when a violinist is looking down on the instrument the butterfly effect 26 is functional whereby the first string on the staff is the G followed by D,A and E. The numeric value of the note 12 is placed on the specific string 34 and the letter associated in reference to the A, B, C, D, E Morpheus finger chart 14 is placed beside the numeric value 38 as used in Morpheus Guitar Notation 34. To enable the person to train themselves in references to what these numeric values should sound like a disc with the full tonal range of the violin is used. So on the disc the author would say 40, which is C4 on classical piano layout 10 for example, then the sound of this note is played. Again each structure for Morpheus Music Notation must be developed from the origin of the classical piano layout in 10. As the violin is fretless all other fretless stringed instruments would follow the same pattern. Each structure being based on the amount of strings the particular fretless stringed instrument has. Along with this the idea mentioned in breathing movements 78 in Morpheus Wind Notation could be applied here where the violin is literally breathing in and out when the bow is used to play the numeric values on the violin. So breathing in i.e., the bow is pushed to the left indicated by <and when breathing out the bow is pushed to the right>. These two symbols could be placed above the numeric value on the staff to indicate the movement of the bow.

With reference to an instrument like the Mandolin which has pairs of strings where each pair of strings represent G, D, A and E. The Morpheus String Notation for this instrument would have a staff consisting of eight lines and because it is an instrument like the guitar where you look down on it, the first line on the staff would be G1, G2 then D1, D2 and so on. Then the numeric values 38 would be used to indicate the note as referenced to the classical piano layout 10 along with the finger configuration chart in 14 and 16.

The same idea could be applied to the 12 string guitar where you have a set of twelve strings E1, E2, A1, A2, D1, D2, G1, G2, B1, B2, E1, E2 centred around a twelve line staff and as before 34 the low E is indicated as the first line on the staff.

Application Two-Clarinet (Wind)

The clarinet 40 and many brass instruments because of their complexity in releasing air in & out are very difficult instruments to master. Current philosophy when it comes to the clarinet is practice your scales before you proceed any further. It is very unfair to a child who begins to play the instrument. If there was an organised chart to say what notes to play with what valves, keys etc with regards to wind instruments, it could enable a player to practice without breathing into the instrument. Although breathing is a very important part in a wind instrument if you are out of breath after 15 minutes practicing, you won't get much done in such a short period of time. The inventor recommends the following.

Depending on how many keys, buttons 48 etc., that can be depressed are laid out in the staff in Morpheus Wind Notation 50 and 52 for Wind Instruments. A staff say with twenty four lines 50 and 52 for the clarinet 40 as an example is created representing each depressible key 48. Using the Finger chart 14 and 16 A, B, C, D, E, F, G, H, I, J the staff 50 and 52 will display top-down motion as mentioned earlier so E indicating i.e., left hand thumb is placed toward the top of the staff 50 as the left hand 14 is the upper hand used when playing the clarinet and the rest of the finger letters follow down the staff 52. Because of the several different types of wind instruments available corresponding to various keys i.e., like the saxophone for example where there are several different grades of saxophones a chart is created for each individual type. The student then instantly knows the fingering 56 involved when playing the instrument and whatever specific note. A separate line 54 is then added and the exact note played is referenced to the classical piano 10 (base instrument) number i.e., B flat=the 26th key on the piano 12.26 is then placed on this line so the student gets familiar with what range they are playing within the piano 10. An advanced idea could also portray in the Morpheus Notation a list of breathing exercises along with when to breath in before playing a particular note 78 and when to breath out i.e., <=breath in (inhale), >=breath out (exhale).

These symbols could appear above the particular notes 78 to teach the student the importance of when to exhale & inhale while playing specific notes on the clef.

Application Three-Drums (Percussion)

Two drum kits are complied one referred to as DK1 60 which will be standard drum kit containing 17 different percussive sounds.

The list of percussive sounds are as follows:

1. BASS DRUM
2. SNARE DRUM
3. HI-HATS
4. CRASH CYMBAL
5. RIDE
6. CONGA
7. SNARE DRUM II
8. CONGA II
9. CRASH CYMBAL II
10. CRASH CYMBAL III
11. TOM
12. TOM II
13. BASS DRUM II
14. CRASH CYMBAL IV
15. CRASH CYMBAL V
16. TOM III
17. TOM IV

Each percussive instrument is assigned a number which is then placed on the bottom 3 lines of the staff 64 used in Morpheus Percussion Notation 58 for Percussion instruments. The second kit is the Advanced Drum Kit DK2 62 refers to the complete list of percussive sounds from 18–400 as an example currently available in synthesizers in present time. A worldwide standard list of percussive/effects is created and then assigned a number. These numbers are then placed on the upper three lines 66 of the Morpheus Notation for Percussion 58. A letter L=Left; C=Centre; R=Right is placed beside the number 68 in reference to its location within the stereo field.

This would enable complex percussive synthesizer passages to be set down in a notation format for musicians, producers etc, so they know exactly where they had placed a percussive instrument within the stereo field. When the band would then play in a live situation the percussive instruments could be replicated as the musician knows exactly where the sound should be coming from using the Morpheus Notation System for Percussion. The first Kit (DK1) gives a standard drummer an easy way of following music as indicated in 60. The Advanced Kit (DK2) 62 gives the synthesizer musician trying to learn the complex percussive recording a complete and thorough idea of what was involved to create the idea which in turn leads them onto explore new ideas. An example of this is the record by Madonna 'Ray of Light' which was produced with William Orbit. This really was a groundbreaking record with the selection of percussive ideas that were used. Everybody should be allowed to elaborate and build on an idea. That is where the creativity of the human being comes from, the chance to evolve.

Following is a listing of the components used in the best mode preferred embodiment and the alternate embodiments for use with OEM as well as retrofit markets. For the ready reference of the reader the reference numerals have been arranged in ascending numerical order.

010=Piano Keyboard Layout
012=Numeric Value of Musical Note on Keyboard for example 61=A5 on Piano Keyboard
014=Configuration of letters on left hand from pinkie to thumb
016=Configuration of letters on Right hand from thumb to pinkie
018=Right Hand Rama Clef
020=Left Hand Leda Clef
022=Treble Clef prior art notation
024=Bass Clef prior art notation
026=Butterfly Effect
028=Numeric value of note on keyboard shows placement on Clef vis-à-vis finger configuration
030=Prior art music notation symbols (Crotchets, Quavers, Minims)
032=Bottom Up Prior art Guitar Tablature Clef
034=Top Down Butterfly Morpheus String/Fret Notation for Guitars
036=Numeric value of Fret Number and how a "G Chord" is represented on prior art bottom up Guitar tablature
038=Numeric value of Fret Number and how a "G Chord" is represented on morpheus top down Guitar tablature
040=Clarinet
042=Back of Clarinet
044=Displays how the 24 depressible keys on a clarinet are separated where the amount of keys on the instrument are referenced to another clef within the staff containing 12 lines indicating keys to be played with the left hand
046=Displays how the 24 depressible keys on a clarinet are separated where the amount of keys on the instrument are referenced to another clef within the staff containing 12 lines indicating keys to be played with the right hand
048=Each depressible key, valve, button on the instrument within morpheus wind notation (II) 132 is assigned consecutive or alternate numbers or letters in this case from 1–24, but it can also be 1–12 for the left hand keys and 1–12 for the right hand keys 050=This Clef represents all the depressible keys, valves and buttons on the instrument which is for the left hand. The Clef contains 12 lines wherein the number of lines is directly proportional to the number of keys, valves and buttons etc on the instrument 052=This Clef represents all the depressible keys, valves and buttons on the instrument which is for the right hand. The Clef contains 12 lines wherein the number of lines is directly proportional to the number of keys, valves and buttons etc on the instrument 054=A separate single line is added to the staff for morpheus wind notation II 132, where the exact numeric value of the classical piano keyboard is the same note on the clarinet. This numeric value is then placed on the line for example 40=40$^{th}$ note on the classical piano which Is "C" on the clarinet or 47=47$^{th}$ note on the classical piano which is "G" on the clarinet. In order to play G on the clarinet, there are no keys pressed on the instrument, so a single vertical line could be placed on the morpheus wind notation II, 132, across the two clefs to identify this.

056=The hands are assigned letters or numbers from the hand configuration idea and the finger that plays the specific key on the clarinet is placed on the relevant line where this line represents the specific key, valve or button on the instrument. For example H=Middle finger of right hand. This letter is placed on the line of the staff in the lower clef which references keys played with the right hand.

058=Displays the staff that represents the morpheus percussion notation 140, which Contains 3 lines in upper part of clef which is where the numeric values of the DK2 are placed 060=Displays the other 3 lines making up the staff that represents the morpheus percussion notation which contains 3 lines in lower part of clef which is where the numeric values of the DK1 are placed 062=This numeric value in DK2 is the artificial or synthesized drum kit containing all the sounds of contemporary synthesizers. The sounds are listed and assigned numeric value for example between 18 and 400. This list is created by a standard international body much like the way GM sounds in MIDI were created. For example the numeric value of 293 could represent a "Triangle" as played from a synthesizer 064=This numeric value in DK1 is the non-artificial drum kit containing a list of say 1–17 different percussive sounds from a standard drum kit. A international body could create the standard list assigning a numeric value to the particular percussive sound. For example the numeric value of 3 could represent a Hi-Hat as played from the contemporary drum kits.

066=This numeric value in DK2 is placed on one of the 3 upper lines on the clef. For example 72 could represent "AGOGO" Bell from a synthesizer 068=This displays the synthetic percussive sounds relevant in the stereo field where L=Left, C=Center and R=Right in stereo field.

070=On morpheus keyed notation (I) 110, the numeric value of 38=38$^{th}$ note the classical piano is B4 flat i.e. a black note on the piano keyboard. To identify this on the CLEF, the numeric value could be in bold or a larger font to distinguish it from the white notes on the keyboard.

072=To identify chords in the morpheus keyed notation (I) 110, and all other relevant techniques where the numeric values are grouped together to indicate concurrent play 074=A grid is applied to the music sheet where vertical lines (4 in case of 4/4 tempo music) are placed over the two Clefs to indicate beats within a bar. This helps the novice reading the music notation sheet with the timing of the specific numeric values on each of the clefs.

076=In case of two hand tapping on a guitar, the letter of the left hand in regards to finger configuration is placed beside the numeric value to indicate notes played with the other hand also 078=Symbolic representation of breathing movements where <=inhale and >=exhale placed above the staff or even within the staff to indicate the breathing movement while playing the wind instrument 130. It should be noted that a similar concept can also be used in other scenarios where an instrument like the violin, which involved "BOW" movement to the left and right i.e. <Bow pushed to the left and >=Bow pushed to the right 100=Top Down Morpheus notation system generally
110=Morpheus Keyed notation I
111=Key instruments generally
112=Morpheus Keyed notation II
113=Dulcimers, Vibraphones, Xylophones, Cimbaloms & the like
114=Morpheus Keyed notation III
115=Accordions
120=Morpheus String/Fret Notation
121=Guitars (1–12 strings) Mandolins, Banjos, Sitars the like
122=Morpheus String/Non-Fret Notation
123=Cellos, Violins, Violas, Double Bass, Fiddles and the like
124=Morpheus string/plucked notation
125=Harps
130=Morpheus Wind Notation I
131=Recorders, Flutes, Tin Whistles, Piccolos and the like
132=Morpheus Wind Notation II
133=Clarinets, Bassoons, Bagpipes, Saxophones, Trumpets, Oboes, French Horns, Trombones, Baritone Horns, Tubas and the like instruments.
140=Morpheus Percussion Notation
142=Standard Non-Artificial Drum Kit (DK1) and Artificial Synthesized Drum Kit (DK2)

Definitions and Acronyms

A great care has been taken to use words with their conventional dictionary definitions. Following definitions are included here for clarification.

Anubis=A tree like structure that integrates morpheus notation with prior art notation for easy transition DK1 =Standard Non-Artificial Drum Kit DK2 =Artificial Synthesized Drum Kit Integration=Fusing or joining together to become as one unitary member Interface=Junction between two dissimilar but optionally matching entities Morpheus=Two hands independent of each other with global approach all human audio range musical instruments including key, string, wind and percussion and permutations and combinations thereof.

Stave/Staff=A set of n (usually 5) horizontal lines with corresponding (n−1) usually 4 spaces between them on which music is written.

The reader can now readily see how the above detailed description results in the following benefits of the invention over the prior art.

a) User Friendly self teaching of any musical instrument b) Suitable for people of all ages and gender in all types of situations.

c) Multiple uses in a wide range of situations and circumstances.

d) Easily adaptable for other uses.

e) Intuitive top down butterfly morpheus music notation system

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

The invention claimed is:

1. A top down butterfly morpheus music notation system for ease of learning to play a musical instrument comprising the steps of:
   a) a plurality of staves of n horizontal lines;
   b) dividing said staves into left hand leda clef and right hand rama clef;
   c) representing each finger of said left hand leda clef and right hand rama clef by an alphanumeric designation;
   d) transferring said alphanumeric designation to said left hand leda and right hand rama clefs, on said staves;
   e) integrating prior art bass and treble clefs to said left hand leda and right hand rama clefs;
   f) designating each finger of said left hand leda clef and said right hand rama clef by an alpha character; and
   g) representing said left hand leda clef fingers as A=pinkie finger, B=ring finger, C=middle finger, D=index finger, E=thumb and said right hand rama fingers as F=thumb, G=index finger, H=middle finger, I=ring finger and J=pinkie finger.

2. The top down butterfly morpheus music notation system for ease of learning a musical instrument of claim 1 wherein said alpha designations A, B, C, D, E, F, G, H, I and J are transferred to said Leda (Left Hand) & said Rama (Right Hand) Clefs.

3. A method of learning and teaching a musical instrument incorporating a top down butterfly morpheus music notation integrated structure comprising the steps of:
   a) representing each musical note by a numeric value between 1 and 88 on plurality of staves;
   b) representing each finger of left hand leda clef and right hand rama clef by an alphanumeric designation;
   c) transferring said alphanumeric designation to said left hand leda clef and said right hand rama Clef, on said staves;
   d) integrating prior art bass and treble clefs to said leda and rama clefs; and
   e) representing said left hand leda clef fingers as A=pinkie finger, B=ring finger, C=middle finger, D=index finger, E=thumb and said right hand rama fingers as F=thumb, G=index finger, H=middle finger, I=ring finger and J=pinkie finger.

4. The method of learning and teaching a musical instrument incorporating a top down butterfly morpheus music notation system of claim 3 wherein said alpha-numeric designation letters A, B, C, D, E, F, G, H, I and J are transferred to said Leda (Left Hand) & said Rama (Right Hand) Clefs where said morpheus top down notational structure is formed in accordance with the said butterfly effect.

5. The method of learning and teaching a musical instrument incorporating a top down butterfly morpheus music notation system of claim 4 wherein said letters of the said Leda & Rama Clefs are integrated to create said top down butterfly structure including integration of traditional musical clefs of said numeric values in the range of 1–88 and said left and right hand finger designations.

6. The method of learning and teaching a musical instrument incorporating a top down butterfly morpheus music notation system of claim 5 wherein said integrated structure of said leda and rama clefs is represented in Braille.

7. A method of learning and teaching a musical instrument incorporating a top down butterfly morpheus music notation integrated structure comprising the steps of:
   a) representing each musical note by a numeric value between 1 and 88 on plurality of staves;
   b) representing each finger of left hand leda clef and right hand rama clef by an alphanumeric designation;
   c) transferring said alphanumeric designation to said left hand leda clef and said right hand rama Clef, on said staves;
   d) integrating prior art bass and treble clefs to said leda and rama clefs; and
   e) wherein said musical instrument is a percussion instrument and wherein drum kit 1 comprises percussion sounds 1–7 and said drum kit 1 is represented on bottom 3 lines of said staves and drum kit 2 comprises percussion sounds 18–400 and wherein said drum kit 2 is represented on top 3 lines of said staves to represent complete list of 18–400 percussion sounds.

* * * * *